United States Patent Office 3,677,940
Patented July 18, 1972

3,677,940
METHOD OF TREATING SCOURING AND DYEING WASTE WATER
Hiroshi Fujimoto, Hirakata-shi, and Mitsugu Fukuda, Takatsuki-shi, Japan, assignors to Kurita Water Industries Ltd., Osaka-shi, and Unitika Ltd., Hyogo-ken, Japan
No Drawing. Filed Feb. 16, 1971, Ser. No. 115,688
Claims priority, application Japan, Feb. 18, 1970, 45/14,345
Int. Cl. C02c 5/02
U.S. Cl. 210—44                10 Claims

ABSTRACT OF THE DISCLOSURE

A method of treating a wool scouring waste water and a dyeing waste water which comprises the steps: mixing the scouring waste water and dyeing waste water; adding to the mixed liquid thus prepared a coagulant consisting of an inorganic metallic salt and adjusting the pH to thereby give rise to flocs of metallic hydroxide; further adding an anionic organic coagulant to thereby give rise to aggregation of said flocs; and separating the resulting sludge.

BACKGROUND OF THE INVENTION (a) Field of the invention

The present invention relates to a method of treating the waste water arising from the process of scouring raw wool, and the waste water arising from the process of dyeing, in general, simultaneously and efficiently.

(b) Description of the prior art

The wool scouring waste water is a suspended or emulsified waste water containing a lot of oil and fat, earth and sand, excrement of sheep, seeds of herbs, surface active agent, etc. and its treatment is very difficult. The conventional methods of treating waste water of this kind include the acid cracking method, methods employing aluminum sulfate, lime or the like, but none of them has proved effective in performing a perfect treatment of said waste water. For instance, the method using aluminum sulfate, which comprises the steps of adding aluminum sulfate to said waste water and effecting aggregation and precipitation by regulating the pH by means of alkali such as lime, is not practical in the light of the fact that the resulting sludge consisting of hydroxide is of poor quality so that the sludge volume is increased and the separation rate of the sludge is low.

On the other hand, the dyeing waste water in general contains various dyes for wool, synthetic fiber, etc. and its treatment is also very difficult, so that the conventional method of using such inorganic metallic salts as aluminum sulfate to effect aggregation has been insufficient for accomplishing aggregation of varieties of colored components for the purpose of complete removal thereof.

The majority of the factories where the wool scouring is performed also deal with dyeing concurrently and, as a result, two kinds of waste waters as above are frequently discharged therefrom simultaneously. In due consideration of the fact that these waste waters are of different compositions whose components may interact on each other to give rise to an undesirable effect, there have hitherto been proposed various methods of treating them separately, but none of these methods has proved effective.

SUMMARY OF THE INVENTION

The present inventors have conducted a series of researches on the properties of the two kinds of waste waters mentioned above and have devised a method which is capable of effectively treating them very simply and inexpensively by means of simultaneous treatment by mixing said two waste waters so as to make the components of both waste waters effectively interact on each other and to give rise to aggregation by virtue of inorganic metallic salts such as aluminum sulfate, iron chloride, etc.

In other words, the present invention relates to a method of treating the scouring waste water and dyeing waste water which comprises the steps: mixing the two kinds of waste waters mentioned above; adding a coagulant consisting of an inorganic metallic salt to a mixture of said waste waters; effecting the formation of flocs of hydroxide by regulating the pH; effecting aggregation of said floc by further adding an anionic organic coagulant; and subsequently separating the sludge resulting from said aggregation.

DESCRIPTION OF THE PREFERRED EMBODIMENTS

The simultaneous treatment of a mixture of the scouring waste water and the dyeing waste water according to the present invention has such a merit that such ingredients as earth and sand, excrement of sheep, oil and fat contained in the scouring waste water function as an assistant coagulant and settle while absorbing dyes and other ingredients of the dyeing waste water at the time of forming the aggregated floc, so that not only is it possible to remove the colored substances, but also the sludge which settles while absorbing the colored substances as above is compact, small in sludge volume, and possessed of superb separability. Accordingly, the sludge thus formed can be easily separated through sedimentation, flotation, filtration and the like, and the quality of the treated water becomes quite satisfactory.

The scouring waste water generally contains a variety of foreign elements mentioned above in so high a concentration that it is usually necessary to dilute it to an appropriate concentration in order to perform an aggregation treatment. According to the present invention, an appropriate dilution of the scouring waste water required as above is achieved by using the dyeing waste water. In this connection, it is advisable that the scouring waste water be subjected to a preliminary treatment for the purpose of separating solid matters therein sedimentation in a sedimentation tank prior to mixing with the other waste water. The mixing ratio of the two waste waters can be determined at will depending upon the concentration as well as the composition thereof; although it is generally in the range of 4:1–1:4, there is no necessity for strictly adhering to the foregoing mixing ratio as long as there is no excessive deviation therefrom. As the coagulant consisting of inorganic metallic salt for use in the present invention, then are applicable such coagulants as an aluminum salt such as aluminum sulfate, aluminum chloride and polyaluminum chloride, an iron salt such as ferric sulfate, ferric chloride and ferrous chloride, a zinc salt such as zinc chloride and zinc sulfate and, titanium slag, and capable of releasing polyvalent metallic cations Any of these coagulants is made into an aqueous solution of 10–40% or thereabout, and said aqueous solutions added to the mixture of waste waters to obtain the concentration thereof in the range of 100–1200 p.p.m., and subjected to stirring. On this occasion, it is necessary to adjust the pH in the range of 5–11 as required for generating the floc of hydroxide through hydrolysis of the added metallic salt within the mixed liquid, and, for this purpose, an alkaline agent such as sodium hydroxide, calcium hydroxide and the like is added in the liquid. The preferable pH range is 5–8 for the aluminum salt, 5–11 for the ferric salt, 6–9 for the ferrous chloride and 8–11 for the zinc salt.

In this state of the mixed liquid, the floc of hydroxide produced therein still exists in the form of fine particles, and this floc of hydroxide can be made to agglomerate further by adding an anionic organic coagulant to the mixed liquid, resulting in a large sized, compact sludge with superb separability. As for the organic coagulant to add, it being for the purpose of effecting aggregation of the cationic metallic hydroxide, any anionic organic coagulant will do: for instance, such anionic organic coagulants as partially hydrolyzed polyacrylamide, polyacrylic acid or salt thereof, anion-modified polyacrylamide, sodium alginate, sodium salt of carboxymethylcellulose, etc. are all applicable. The amount of this coagulant to be added is in the range of 1–5 p.p.m., and, after adding, it is mixed by stirring.

The sludge thus obtained is left standing so as to let it settle and separate and it can be subsequently subjected to filtration for dehydration. It is also possible to have the sludge floated and separated in a concentrated state by making it float by means of gas-bubbles blown into the mixed liquid by taking advantage of adhering to gas-bubbles a lot of surface active agent contained in the mixed liquid. In the method of separating the sludge by flotation, a mixed liquid, after the aggregation process, is introduced into a flotation tank in which the sludge is made to float by virtue of the air blown into the tank from its lower parts. On this occasion, a method of pressure flotation, which comprises the steps of forming a pressurized water by dissolving air in some water, e.g. a separate portion of the mixed liquid or treated waste water under elevated pressure, mixing said pressurized water with the mixed liquid to be treated, and obtaining fine gas-bubbles by applying reduced pressure, is particularly suitable. According to this method of pressure flotation, not only the fine gas-bubbles ascend accompanied by the sludge adhering thereto but also the surface active agents as well as organic matters contained in the mixed liquid ascend in the state of being concentrated on the surface of each gas-bubble, so that the sludge thus separated comes to be of high concentration while the concentration of the impurities in the treated water becomes extremely low.

As elucidated in the foregoing, the method according to the present invention featuring the mixing and simultaneous treatment of the scouring waste water and the dyeing waste water, which waste waters have hitherto been treated individually and considered difficult to treat, not only renders it possible to perform the treatment of these two waste waters through quite a simple operation but also displays a remarkably high efficiency in said treatment.

EXAMPLE 1

The scouring waste water was left to settle naturally for 10 hours and mixed thereafter with the dyeing waste water in an amount of four times as much as the former. Said dyeing waste water arising from dyeing contained acid mordant dye for wool, potassium bichromate mordant dye, reactive dye and azo-type dispersed dye for synthetic fiber and presented a mixed color of red, green, blue and black. Aluminum sulfate in the amount of 400–600 p.p.m., was first added to the mixed waste water, and next calcium hydroxide in the amount of 350–400 p.p.m. was added to the same to thereby adjust the pH to be 6.5. After about 5 minutes at the concentration with rapid stirring, 30%-hydrolyzed polyacrylamide was added at a rate of 2 p.p.m. and mixed by about 1 minute stirring. Upon introducing the thus treated mixed waste water into a flotation tank, pressure water which was prepared by dissolving the air in a separate portion of the treated waste water by applying a pressure of 3 kg./cm.² was blown into the stock in said tank, whereby the sludge was separated by the aforementioned method of pressure flotation. The flotation rate of the sludge in this case was 10–15 m./hr., the concentration of solid matter in terms of separated sludge having a sludge-volume of 6–7 vol. percent after 10 minutes was 3.8 wt. percent, and the comparative quality of the mixed waste water and the treated water was as shown in the following Table 1.

TABLE 1

| | Mixed waste water | Treated water | | |
|---|---|---|---|---|
| | | Example 1 | Example 2 | Example 3 |
| Appearance | (1) | (2) | (2) | (2) |
| pH | 4.6 | 6.5 | 7 | 7 |
| Transparency (degree) | <0.5 | 10–12 | 13–14 | 12–13 |
| COD (p.p.m.) | 800–900 | 100–130 | 130 | 120–130 |
| SS (p.p.m.) | 150–300 | 10–30 | 20–30 | 20–30 |
| Oil and fat (p.p.m.) | 870 | 10–15 | 10–15 | 10–15 |

1 Turbid with reddish brown color.
2 Slightly turbid with light yellow color.

COMPARATIVE EXPERIMENT 1

In case the treatment was conducted of the same scouring waste water in the same way as Example 1 except for diluting said waste water with tap-water in the amount of four times as much as the former, the resultant sludge-volume was about 50% (in case the scouring waste water was undiluted, it was about 80%) and the sludge was inseparable.

COMPARATIVE EXPERIMENT 2

In case of the individual treatment of the dyeing waste water, although there was formed the floc of aluminum hydroxide, there was little change in the color of the treated water waste water compared with the waste water before treatment, that is, it was impossible to effect decoloring.

COMPARATIVE EXPERIMENT 3

The treatment was conducted in the same way as in Example 1 except for omitting application of said partially hydrolyzed polyacrylamide. In this case, the floc of aluminum hydroxide was kept in suspension an overall and the flotation rate was low.

EXAMPLE 2

By adding first 400 p.p.m. of ferric chloride and next 450 p.p.m. of calcium hydroxide to the same mixed liquid as in Example 1, the pH was adjusted to be 7. Subsequent to about 5 minute rapid stirring of the mixed liquid processed as above, 30%-hydrolyzed polyacrylamide was added to said mixed liquid and mixed therein by stirring for about 1 minute. Thereafter, the mixed liquid was introduced into a flotation tank in which the sludge was separated through the pressure flotation process utilizing pressurized water in the same way as in Example 1. The flotation rate of the sludge in this case was 5 m./hr., the sludge volume after 10 minutes was 7–8 vol. percent, and the quality of the treated water was as shown in Table 1.

EXAMPLE 3

The treatment was conducted in the same way as in Example 2 except for substituting ferric sulfate for ferric chloride. The quality of the treated water was as shown in Table 1.

EXAMPLE 4

By employing the waste water prepared by mixing the scouring waste water which was left to settle naturally for 10 hours and the dyeing waste water of polyester fibers in the amount of four times as much as the other, treatment was conducted through the same operation as in Example 1. Said treatment was performed in two ways: (A) addition of aluminum sulfate by 800 p.p.m., calcium hydroxide by 320 p.p.m., and partially hydrolyzed polyacrylamide by 2.5 p.p.m., in that order; (B) addition of aluminum sulfate by 1200 p.p.m., calcium hydroxide by 450 p.p.m., and partially hydrolyzed polyacrylamide by 2.5 p.p.m., in that order. The comparative results of these treatments were as shown in the following Table 2.

TABLE 2

|  | Mixed waste water | Example 4 | | |
|---|---|---|---|---|
|  |  | Treated water (A) | Treated water (B) | Treated water (Example 5) |
| Appearance | (1) | (2) | (2) | (2) |
| pH | 7.1 | 6.2 | 6.2 | 6.5 |
| Transparency (degree) | 0.5 | 13.2 | 22.9 | 14.5 |
| COD (p.p.m.) | 360 | 73.2 | 60.0 | 85 |
| SS (p.p.m.) | 206 | 22 | 33 | 35 |

1 Turbid with yellow-brown color.
2 Slightly turbid with light yellow color.

EXAMPLE 5

Subsequent to adding 1200 p.p.m. of aluminum sulfate and 450 p.p.m. or calcium hydroxide, in that order, to a mixed waste water prepared in the same way as in Example 4 and mixing them by rapid stirring, 2.5 p.p.m. of partially hydrolyzed polyacrylamide was added to the mixture and mixed therein by stirring. The liquid thus prepared was introduced into a flotation tank provided with an air-spreading pipe on the bottom thereof, and, by virtue of the air supplied through said pipe, the sludge was made to adhere to air-bubbles to thereby ascend for separation. The result was as shown in Table 2.

EXAMPLE 6

To the waste water prepared by mixing the scouring waste water and the dyeing waste water equivalently were added 1500 p.p.m. of ferrous sulfate, 500 p.p.m. of calcium hydroxide and 3 p.p.m. of partially hydrolyzed polyacrylamide and mixed therein by stirring. Subsequently, the mixed liquid was introduced into a sedimentation tank in which it was left standing for 24 hours to make the sludge settle, and thereafter the supernatant liquid was removed.

The comparative quality of the waste water before and after treatment was as shown in Table 3.

TABLE 3

|  | Mixed waste water | Treated water |
|---|---|---|
| Appearance | (1) | (2) |
| pH | 5.9 | 7.2 |
| Transparency (degree) | 1.0 | 15 |
| COD (p.p.m.) | 280 | 70 |
| SS (p.p.m.) | 270 | 35 |
| Oil and fat (p.p.m.) | 210 | 40 |

1 Turbid with bluish green color.
2 Tinted with light yellow.

What is claimed is:

1. A method of treating wool scouring waste water and dyeing waste water, which comprises the steps of: mixing wool scouring waste water and dyeing waste water to obtain a liquid mixture; adding to said liquid mixture inorganic metallic salt coagulant in an amount in the range of from 100 to 1200 p.p.m., based on the amount of said liquid mixture; adding alkali to the liquid mixture to adjust the pH thereof in the range of from 5 to 11 to thereby generate flocs of metallic hydroxide; adding to said liquid mixture anionic organic coagulant in an amount in the range of from 1 to 5 p.p.m., based on the amount of said liquid mixture, to cause aggregation of said flocs to form a sludge; and then separating the sludge from the remainder of said liquid mixture.

2. A method according to claim 1, wherein the mixing ratio of the scouring waste water and the dyeing waste water is in the range of 4:1–1:4.

3. A method according to claim 1, wherein said wool scouring waste water is subjected to a preliminary process of sedimentation to have the solid matters therein settled and separated, prior to mixing same with the dyeing waste water.

4. A method according to claim 1, wherein said inorganic metallic salt coagulant is a member selected from the group consisting of aluminum sulfate, aluminum chloride, polyaluminum chloride, ferric sulfate, ferric chloride, ferrous chloride, zinc chloride, zinc sulfate and titanium slag.

5. A method according to claim 1, wherein said anionic organic coagulant is a member selected from the group consisting of partially hydrolyzed polyacrylamide, anion-modified polyacrylamide, polyacrylic acid or salt thereof, sodium alginate, and the sodium salt of carboxymethylcellulose.

6. A method according to claim 1, wherein the separation of the sludge is performed by a flotation process.

7. A method according to claim 1, wherein the separation of the sludge is performed by making the sludge float by adhering to gas-bubbles emerging from added pressurized water containing a gas dissolved therein by pressure.

8. A method according to claim 7, wherein a portion of the liquid mixture is utilized as the pressurized water.

9. A method according to claim 7, wherein said remainder of the liquid mixture is utilized as the pressurized water.

10. A method according to claim 1, wherein the sepaaration of the sludge is performed by sedimentation.

References Cited

UNITED STATES PATENTS 2,762,681  9/1956  Crowley _____ 210—52 X

FOREIGN PATENTS 662,534  5/1963  Canada _____ 210—54

OTHER REFERENCES

Rudolfs, W.: Industrial Wastes, 1953, Reinhold Publishing Corp., New York, pp. 172–177, 183–190 and 193 relied on.

Symons, G. E.: Coagulation, Water & Sewage Works, vol. 102, November 1955, pp. 470–475.

Float-Treat System, publication of Rex Chainbelt Co., Milwaukee, Wis., Bulletin 54–82, 1957, pp. 1–11 relied on.

MICHAEL ROGERS, Primary Examiner

U.S. Cl. X.R.

8—141; 210—52, 60